3,301,492
VARIABLE AREA NOZZLE
Warren G. Kingsley, New York, N.Y., assignor to The Bendix Corporation, Elmira, N.Y., a corporation of Delaware
Filed Sept. 24, 1964, Ser. No. 398,918
1 Claim. (Cl. 239—535)

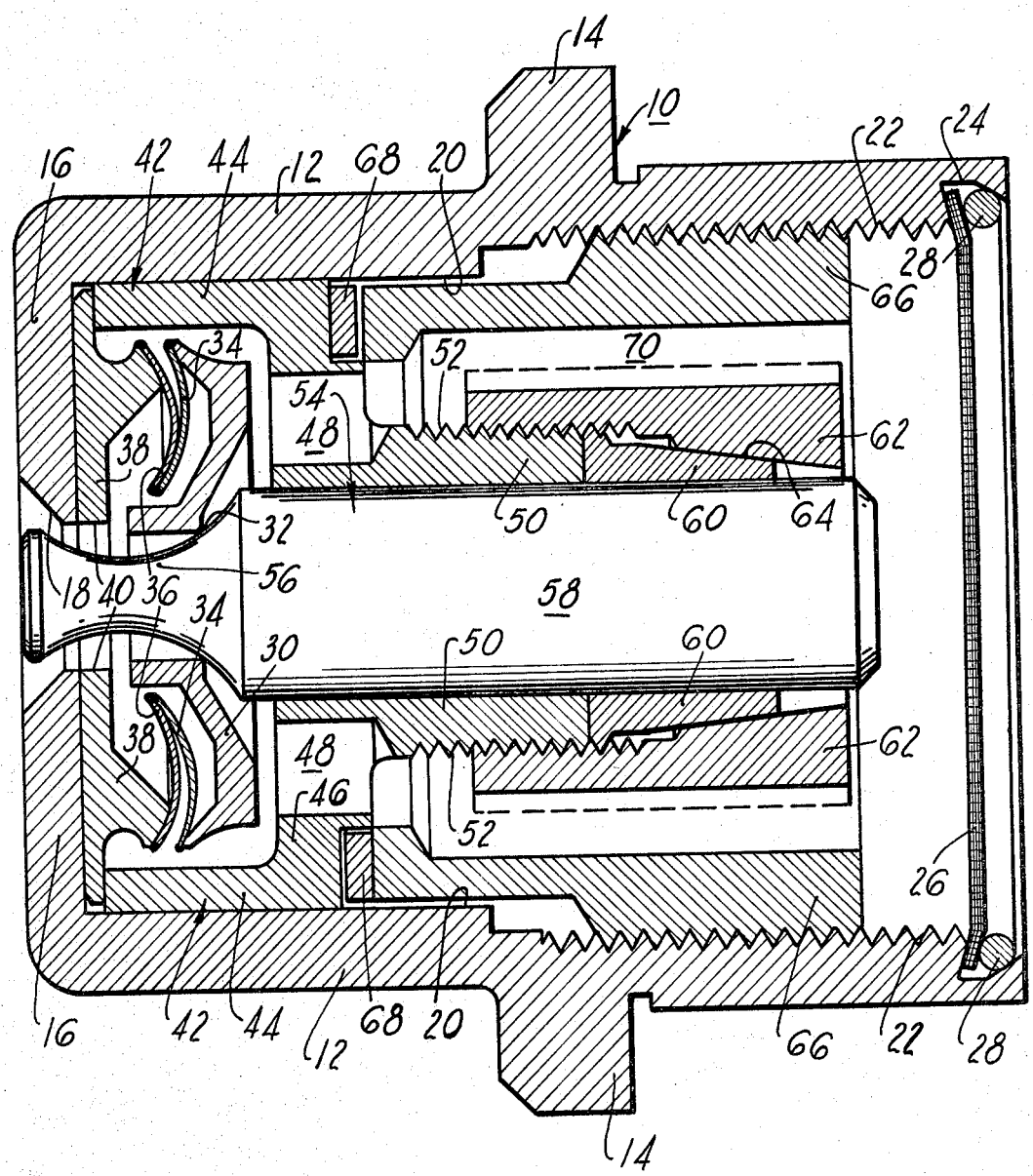

The present invention relates to a variable area nozzle, particularly adapted as a fuel nozzle.

It is an object of the present invention to provide a simple and reliable nozzle design which can be inexpensively manufactured, easily assembled and calibrated and will provide accurate spray control and will be insensitive to gumming or clogging in use.

Other objects and advantages of the present invention will become apparent on consideration of the accompanying description and drawing.

Referring to the drawing, my nozzle device is generally indicated by numeral 10 and includes a generally-cylindrical nozzle body 12. The nozzle body has a circular flange 14 for seating on a combustion chamber wall. The left end of the nozzle body is substantially closed by the wall 16 which, however, contains a central fuel discharge port 18 at its center. The inner diametrical surface of body 12 has a smooth cylindrical section over a portion of its length indicated by numeral 20 and a threaded portion 22 over substantially the balance of the surface. At the right end of body 12, a circular snap ring groove 24 is formed which forms a support for the peripheral edge of screen 26 which is then removably retained in position by circular snap ring 28.

A movable valve seat 30 is disposed within the valve body and is of generally annular configuration having a fuel discharge orifice 32 formed at its center. The outer peripheral edge of seat 30 is connected as by welding or the like to a first annular spring member 34. Spring member 34 is connected at its inner edge to a second annular spring member 36 which in turn is connected at its outer edge to annular disc anchor plate 38. Together, the first and second spring members provide an assembly movable in an axial direction against the spring rate deformation characteristic of the members while maintaining relatively high rigidity in a radial direction. The spring members collectively function similarly to a bellows assembly and are referred to as such herein; and similar to a bellows, for special operating characteristics a number of convolutions may be provided. The disc anchor plate has a central port 40 generally in alignment with port 18 of the wall 16. The outer diameter of plate 38 is spaced from the smooth surface 20 by generous clearance space.

A guide member 42 is comprised of three integral sections: first, a large diameter sleeve section 44 closely fitting within the smooth valve body surface 20 and abutting at its end against anchor plate 38; second, a radially-depending section 46 in which there are formed a plurality of axially extending passages 48 annularly arranged around the radial section; and third, a smaller diameter axially-extending sleeve section 50 which has threads 52 formed on its outer surface.

A fixed valve member 54 has a contoured valve end 56 and a stem end 58 fitted within the sleeve section 50 of guide member 42. The contoured valve end 56 extends through valve orifice 32 and ports 40 and 18 of the anchor plate and body end wall respectively. Valve member 54 is fixedly locked in position by wedge ring 60 and collar 62 which have complementary beveled surfaces mating at 64. As collar 62 is tightened on threads 52, ring 60 is deformed inwardly, thus wedging the stem 58. If desired, ring 60 may be split to more readily deform. When collar 62 is tightened, it will be observed that guide 42, fixed valve 54, ring 60 and collar 62 become a rigid integral assembly. This integral assembly is in turn locked tight within the valve body by ring 66 which threadedly engages the valve body threads 22 and provides a holding force through washer spring 68. The inner diameter of ring 66 is spaced outwardly from collar 62 to provide an annular fuel delivery channel 70 which communicates with passages 48.

*Operation*

Pressurized fuel is supplied to the right open end of the valve body 12 where it passes through filter screen 26 and into the annular passage 70 and then through the passages 48 to the chamber surrounding valve seat 30. If the pressure is below a predetermined value established by the preload of springs 34 and 36, it will not cause the valve seat to open. Above this predetermined value, the fuel fluid pressure acting on the end surface of valve seat 30 will overcome the force of the springs and open the valve seat an amount proportional to fuel pressure. The fuel passing through the orifice 32 of valve seat 30 follows the contour of the valve end 56 and passes through ports 18 and 40 to spray externally of the nozzle body in the form of a hollow cone fuel spray. As the contoured valve end is fixed and extends considerably posterior to the orifice 32, the spray angle remains substantially constant for different fuel quantities and positions of seat 30. Additionally, as the valve 54 is fixed and the valve seat 30 is a floating member with ample clearance on all sides, my device is free from sliding parts and thus, resistant to clogging due to dirt entrained in the fuel or fuel gumming effects resulting from thermal decomposition of fuel.

During the assembly of my nozzle, the anchor plate 38, springs or bellows 34–36, and seat 30 may be pre-assembled as a unit and then is freely inserted into the nozzle body. Valve 54 may be pre-assembled in guide 42 and preferably only a light tightening torque applied to collar 62. The combined guide valve assembly is then inserted with the contoured valve end 56 passing through orifice 32 and ports 18 and 40. As the anchor plate 38 is loosely fitted in the valve body bore 20, valve end 56 acts as a locating pilot with orifice 32 causing the valve seat 30 to line up with zero eccentricity with the valve 54. When this alignment has been accomplished, washer 68 and ring 66 are inserted and ring 66 is tightened, locking the device in its aligned position. It will be observed that by this means the orifice 32 and seat 30 may be separately machined without regard to concentricity with valve 54 or guide 42, thus greatly simplifying the manufacturing task and expense.

Calibration of the valve is accomplished by moving the valve 54 axially until the proper spring load of springs 34 and 36 is maintained to establish valve opening at the selected predetermined fuel pressure. When calibration is completed, collar 62 is tightened, screen 26 and lock ring 28 inserted to complete the valve assembly.

While it is apparent from the foregoing that my valve device will be economical to manufacture and reliable in operation, I have found that a number of less obvious advantages are obtained. The valve is capable of producing a linear fuel flow vs. pressure relationship. It is capable of operation over a large flow ratio range. That is, a good spray can be developed at up to 1/50 the maximum spray (50 to 1 ratio) within reasonable pressure ranges. Still further, in installations requiring matched nozzle performance between a plurality of nozzles, this can be more readily accomplished with my device than with known prior art devices. For example, any variation in the rates between springs 34 and 36 of different nozzles may be compensated by changing the diameter of orifice 30. It will be understood that in any device this may be readily accomplished as concentricity is not a problem. The valve seat 30 is simply removed, machined larger and reinserted until an acceptable match between nozzles is obtained. Other devices would normally require a part substitution or elaborate set-up techniques to maintain concentricity or desired spray angle.

It is also to be noted that greater flexibility in spring rate characteristics may be obtained by the addition of helper springs, either aiding or opposing springs 34 and 36 and the practice of the present invention does not preclude these straightforward additions.

It will be apparent that other structural variations of the subject invention are possible within the scope of the teachings hereinabove set forth and it is contemplated that such variations shall come within the spirit and scope of my invention as set forth in the appended claim.

I claim:

A variable area nozzle comprising:
 a valve body having a cylindrical interior chamber;
 said valve body having a transverse wall at one end having a first central fuel deliver port extending therethrough;
 an annular anchor plate disposed in said interior chamber abutting said transverse wall;
 said anchor plate having a second central fuel delivery port in alignment with said first central fuel delivery port;
 an annular valve seat member having a central valve orifice formed therein;
 spring means interconnecting said valve seat member and said anchor plate permitting axial movement of said valve seat member relative to said anchor plate in opposition to the spring bias provided by said spring means;
 said anchor plate having peripheral clearance relative to the interior surface of said cylindrical interior chamber;
 a sleeve guide member arranged in said cylindrical interior chamber;
 a valve member having an extending contoured end secured within said sleeve guide member;
 said contoured end of said valve member extends through said central valve orifice operative to locate said valve seat member and said anchor plate radially in alignment with said valve member;
 locking means operative to lock said sleeve guide member into abutting relationship with said anchor plate to fixedly secure said anchor plate and said valve seat member in alignment with said valve member; and
 collar and locking means adjustably connecting said valve member within said sleeve guide to permit selective axial adjustment of said valve member.

References Cited by the Examiner

UNITED STATES PATENTS 1,589,241  6/1926  Scott _____ 239—535

FOREIGN PATENTS 909,736  1/1946  France.
1,218,966  12/1959  France.
565,999  12/1944  Great Britain.

EVERETT W. KIRBY, *Primary Examiner.*